Oct. 18, 1932.　　　A. RONNING　　　1,883,407
EXTENSION FRAME FOR TRACTORS
Filed March 30, 1929
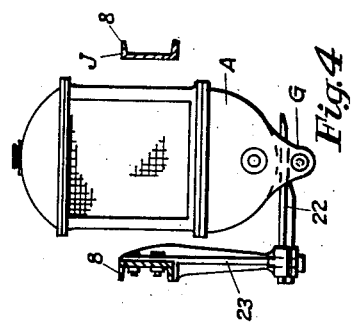
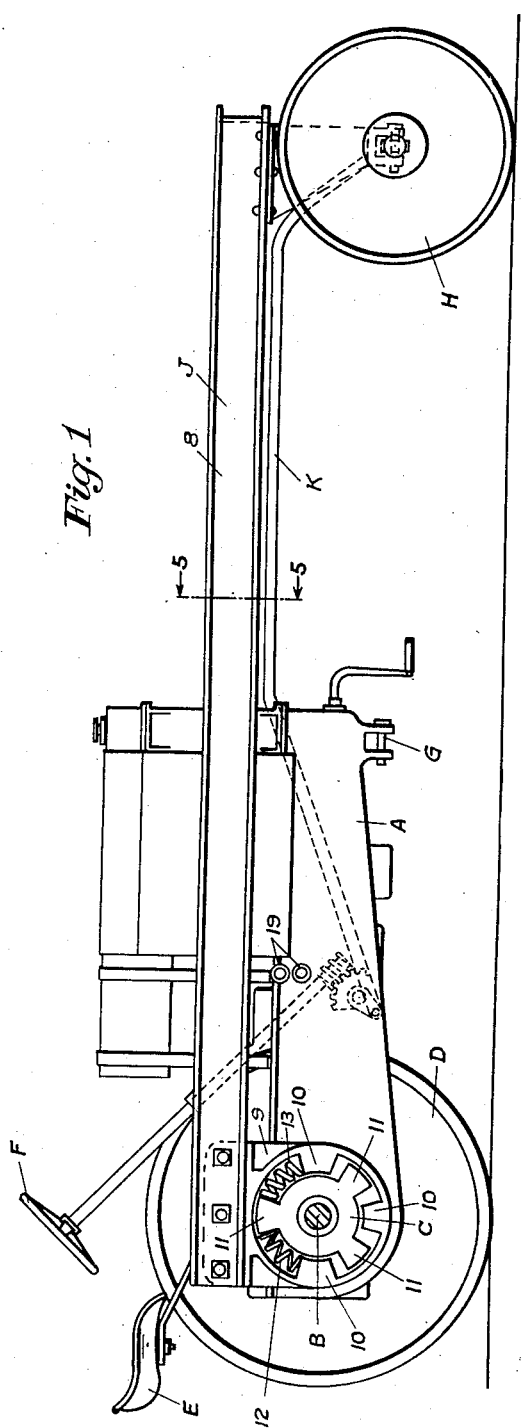
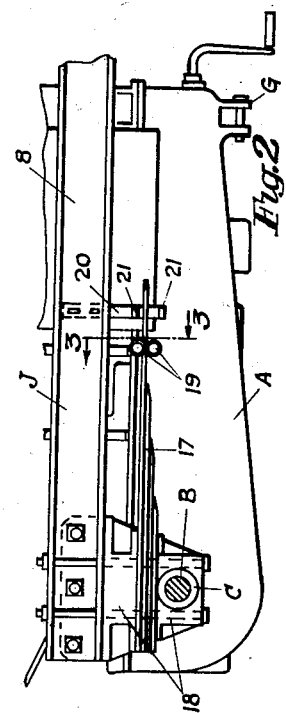
INVENTOR
Adolph Ronning
BY
ATTORNEY Patented Oct. 18, 1932

1,883,407

UNITED STATES PATENT OFFICE

ADOLPH RONNING, OF MINNEAPOLIS, MINNESOTA

EXTENSION FRAME FOR TRACTORS

Application filed March 30, 1929. Serial No. 351,285.

This invention relates to extension frame attachments for tractors, and the primary object is to provide a tractor extension frame with novel, efficient, and practical means for attaching it to the tractor, so as to effectively lengthen the wheel base dimension of the tractor and to provide means for supporting an implement to be propelled and operated in conjunction with the tractor. The invention here disclosed is particularly an improvement over those disclosed and claimed in certain applications filed jointly by Andrean G. Ronning and myself, namely, Ser. No. 451,746, now Patent No. 1,706,256; Ser. No. 133,477, now Patent No. 1,706,257; Ser. No. 726,622, now Patent No. 1,660,050; Ser. No. 182,427, now Patent No. 1,658,354; and pending applications Ser. No. 327,139; Ser. No. 52,137; and Ser. No. 52,138. In each of these patents and applications an implement supporting frame is shown as having a wheeled support at one end while the opposite end portion of the frame is attached to the tractor in such a manner as to support the front end of the tractor from whence the normal steering carriage has been removed In each case, also, the frame consists of substantially parallel side bars, supported in part by resting on the rear axle housings of the tractor, while intermediate or forward portions of the frame bars were secured to the front end of the tractor, to support it, by yokes and similar devices that were required to be passed under the fore end of the tractor. Such devices are obviously simple and efficient methods for so supporting the engine end of the tractor. They do, however, have some objections; namely, that, it is not always convenient to get them under the tractor, especially when the latter may still have its normal fore-carriage attached; they usually require blocking up of the tractor before proper connections can be made; and in the particular instances illustrated there is a rigid connection between the engine and the frame so that vibrations are transmitted directly from one to the other whereas it is desirable, if possible, to flexibly or yieldably support the engine end of the tractor, with respect to the frame, so as to cushion and protect it against jars and vibrations which might otherwise be harmful.

In the accompanying drawing:

Fig. 1 is a side elevation of a standard form of tractor with my improved frame attachment applied thereto.

Fig. 2 illustrates a modification of the invention disclosed in Fig. 1.

Fig. 3 is an enlarged detail section on the line 3—3 in Fig. 2.

Fig. 4 is a sectional elevation showing a modified form of tractor support.

Referring to the drawing more particularly and by reference characters, A designates the body casting or main frame of a common and well known type of tractor having rear axle B, axle housing C, traction wheels D, drivers support E, steering wheel F, and a front coupling bracket G to which the usual steering carriage of the tractor is normally applied. When converting the tractor into a tractor implement the forecarriage is removed and laid aside, or may be applied as the steering carriage H at the front end of the supplemental or implement frame J. In either event the machine is preferably steered by the usual hand wheel F, the steering carriage or truck H being operatively connected therewith by an extension rod K and the usual reducing mechanism of the tractor shown in dotted lines in Fig. 1.

The frame J comprises a pair of side beams 8 connected in any suitable manner at their forward ends where they are supported upon the steering truck H. At their rear ends the beams 8 are each provided, as shown in Fig. 1, with a casting 9 that is supportably trunnioned on the axle housing C, and is provided with inwardly projecting integral lugs 10 that are so arranged that they have freedom for limited oscillating movements between corresponding but outwardly projecting lugs 11 of the axle housing C. A pair of coil springs 12 and 13 are disposed between the upper lug 11 and the side lugs 10, of the casting 9, and the springs 13, at both sides of the tractor, are strong enough to carry the weight of the front end thereof after the steering carriage has been removed, but will do so with a certain degree of flexibility or resiliency, with a result that the front or engine end of the tractor will be flexibly suspended or cushioned with respect to the frame J. The spring 12 need obviously not offer as much resistance as the spring 13, as its primary function is to cushion the lifting tendency applied to the engine end when the tractor wheels D operate against considerable resistance, and consequently they may be of lighter material. In the structure shown in Fig. 1 it will be understood that there are no direct connections between the frame J and the front end of the tractor and consequently the latter is free to oscillate vertically between the members 8.

Figs. 2 and 3 illustrate how the engine end of the tractor may be flexibly supported, with respect to the frame J, by laterally disposed leaf springs 17. These springs are anchored, at their rear ends, in blocks 18, which attach the frame beams 8 to the axle housings C, while their forward ends operate between rollers 19, carried on the tractor body. In this construction it is preferable to fix brackets 20 on the frame J, and provide them with vertically spaced fingers 21 to engage and limit the up and down movement of the front ends of the springs 17.

A single set of transversely disposed leaf springs 22 may be employed, as shown in Fig. 4, to support the front end of the tractor, in which event it is anchored to the lower end of a depending bracket 23, secured to one of the frame beams 8. This construction would of course only be employed where there is freedom for movement between the tractor and frame, as shown for instance in Figs. 1 and 2.

It is understood that suitable modifications may be made in the structure as disclosed, provided such modifications come within the spirit and scope of the appended claims. Having now therefore fully illustrated and described my invention what I claim to be new and desire to protect by Letters Patent is:

1. The combination with a tractor power plant having a rear axle, axle housing and traction devices, of a frame extending longitudinally of the power plant and in advance thereof with its rear end pivotally supported upon said axle housing, a steering device supporting the front end of the frame, and resilient devices carried by the frame, at the rear end thereof, and connected to the power plant to yieldably support the front end thereof with respect to the frame.

2. The combination with a tractor power plant having a rear axle, axle housing and traction devices and having its forward end vertically movable, of a frame extending longitudinally of the power plant and in advance thereof with its rear end pivotally supported upon said axle housing, a steering device supporting the front end of the frame, spring devices at the rear end of the frame and connected to the power plant to yieldably support the same, and means for positively limiting the up and down movement of the front end of the power plant with respect to the frame.

3. The combination with a tractor power plant having a rear axle, axle housing and traction devices, of a frame extending longitudinally of the power plant and in advance thereof with a steering device at the forward end of the frame, bracket members at the rear end of the frame for supportably attaching it to the said axle housing, and spring devices connecting said bracket members to the power plant for yieldingly supporting the front end thereof with respect to the frame.

4. The combination with a tractor power plant having a rear axle, axle housing and traction devices, of a frame extending longitudinally of the power plant and in advance thereof with a steering device at the forward end of the frame, bracket members at the rear end of the frame for supportably attaching it to the said axle housing, and spring devices connecting said bracket members to the power plant for yieldingly and movably supporting the front end thereof with respect to the frame, said spring devices being associated with stops for positively limiting the movement of the front end of the power plant with respect to the frame.

5. The combination with a tractor power plant having a rear axle, axle housings and traction devices, of a frame extending longitudinally of the power plant and in advance thereof with a steering device at the forward end of the frame, bracket members at the rear end of the frame for supportably attaching it to the said axle housing, spring means connecting said bracket members to the power plant for supporting and permitting vertical movement of the front end thereof with respect to the frame, and means for positively limiting the up and down movement of the front end of the power plant with respect to the frame.

6. The combination with a tractor power plant having a rear axle, axle housing and traction devices, of a frame extending longitudinally of the power plant and in advance thereof with a steering device at the forward end of the frame, bracket members rigidly secured to the rear end of the frame and trunnioned to oscillate upon the axle housing, a pair of lugs at one side of the machine carried one by the housing and the other by the adjacent bracket member, and a spring disposed between said lugs and being operative to resiliently support the front end of the power plant.

7. The combination with a tractor power plant having a rear axle, axle housing and traction devices, of a frame extending longitudinally of the power plant and in advance thereof with a steering device at the forward end of the frame, bracket members rigidly secured to the rear end of the frame and trunnioned to oscillate upon the axle housing, and a spring connecting one of the said bracket members to a portion of the axle housing and adapted to coact with the latter to form a resilient support for the front end of the power plant.

8. The combination with a tractor power plant having a rear axle, axle housing and traction devices, of a frame extending longitudinally of the power plant and in advance thereof with a steering device at the forward end of the frame, bracket members at the rear end of the frame for supportably attaching it to the said axle housing, and spring devices anchored to said bracket members and extending forwardly therefrom to form resilient supporting means for the forward end of the power plant.

9. The combination with a tractor power plant having a rear axle, axle housing and traction devices, of a frame extending longitudinally of the power plant and in advance thereof with a steering device at the forward end of the frame, bracket members at the rear end of the frame for supportably attaching it to the said axle housing, and spring devices anchored to said bracket members and extending forwardly therefrom to form resilient supporting means for the forward end of the power plant, said spring devices comprising leaf springs the rear ends of which are rigid with the bracket members.

10. The combination with a tractor power plant having a rear axle, axle housing and traction devices, of a frame extending longitudinally of the power plant and in advance thereof with a steering device at the forward end of the frame, bracket members at the rear end of the frame for supportably attaching it to the said axle housing, and spring devices anchored to said bracket members and extending forwardly therefrom to form resilient supporting means for the forward end of the power plant, said spring devices comprising leaf springs the rear ends of which are rigid with the bracket members, and means for connecting the front ends of the spring devices to adjacent tractor parts.

11. The combination with a tractor power plant having a rear axle, axle housing and traction devices, of a frame extending longitudinally of the power plant and in advance thereof with a steering device at the forward end of the frame, bracket members at the rear end of the frame for supportably attaching it to the said axle housing, and spring devices anchored to said bracket members and extending forwardly therefrom to form resilient supporting means for the forward end of the power plant, said spring devices comprising leaf springs the rear ends of which are rigid with the bracket members and the front ends of which have freedom for up and down movement, and means carried by the frame adjacent the front ends of said spring devices for limiting the up and down movements thereof.

Signed at Minneapolis, in the county of Hennepin, and State of Minnesota, this 28th day of March 1929.

ADOLPH RONNING.